United States Patent [19]

Zyss et al.

[11] Patent Number: 5,449,733
[45] Date of Patent: Sep. 12, 1995

[54] INORGANIC SOL-GEL MATERIAL WHICH HAS A SUSCEPTIBILITY OF THE SECOND ORDER

[75] Inventors: Joseph Zyss, Sceaux; Isabelle Ledoux, Paris; Germain Pucetti, Falch; Pascal Griesmar, Paris; Clément Sanchez, Gif Sur Yvette; Jacques Livage, Bures Sur Yvette, all of France

[73] Assignees: France Telecom; Centre National de la Recherche Scientifique (CNRS), both of Paris, France

[21] Appl. No.: 297,515

[22] Filed: Aug. 29, 1994

Related U.S. Application Data

[63] Continuation of Ser. No. 872,240, Apr. 22, 1992, abandoned.

[30] Foreign Application Priority Data

Apr. 22, 1991 [FR] France .................. 91 04924

[51] Int. Cl.⁶ .............................................. C08G 77/08
[52] U.S. Cl. .................................... 528/9; 528/10; 528/12; 528/21; 528/23; 428/1; 427/487; 252/299.01; 525/389; 525/474
[58] Field of Search .................. 528/10, 9, 21, 23, 12; 428/1; 427/487; 252/299.01; 525/474, 387

[56] References Cited

U.S. PATENT DOCUMENTS

| | | | |
|---|---|---|---|
| 4,801,659 | 1/1989 | Leslie | 525/479 |
| 4,814,017 | 3/1989 | Yoldas et al. | 106/287.12 |
| 4,898,755 | 2/1990 | Che et al. | 427/389.7 |
| 5,130,362 | 7/1992 | Prasad et al. | 524/265 |
| 5,130,397 | 7/1992 | Zeigler | 528/9 |
| 5,272,240 | 12/1993 | Haruvy et al. | 528/10 |
| 5,357,015 | 10/1994 | Haruvy et al. | 528/10 |

OTHER PUBLICATIONS

J. L. Oudar, H. Le Person, Opt. Commun., 15, 258, 1976.
K. D. Singer, M. G. Kuzyk, J. E. Sohn, J. Opt. Ann. B. 4, 968, 1987.

*Primary Examiner*—Frederick Krass
*Assistant Examiner*—Margaret W. Glass
*Attorney, Agent, or Firm*—Jacobson, Price, Holman & Stern

[57] ABSTRACT

The invention relates to a transparent sol-gel material which has a susceptibility of the second order $X_2$, consisting of an inorganic matrix containing organic molecules which have nonlinear optical properties (ONLAOM) oriented in a preferential direction. The materials according to the invention lend themselves to the production of components making use of their linear and nonlinear optical properties (optical telecommunications, processing of the optical signal in analog or digital form, and the like).

4 Claims, 3 Drawing Sheets

FIG_1
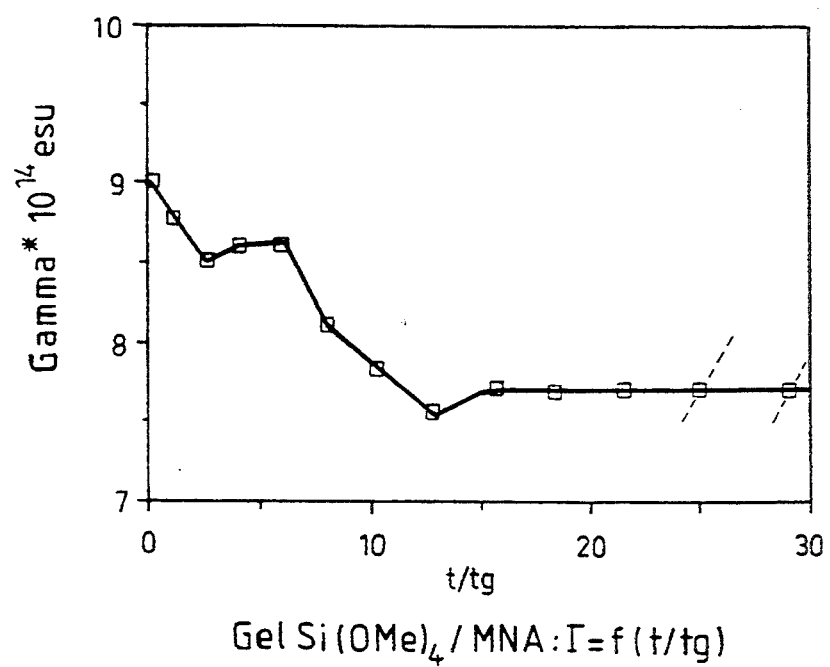

FIG_2
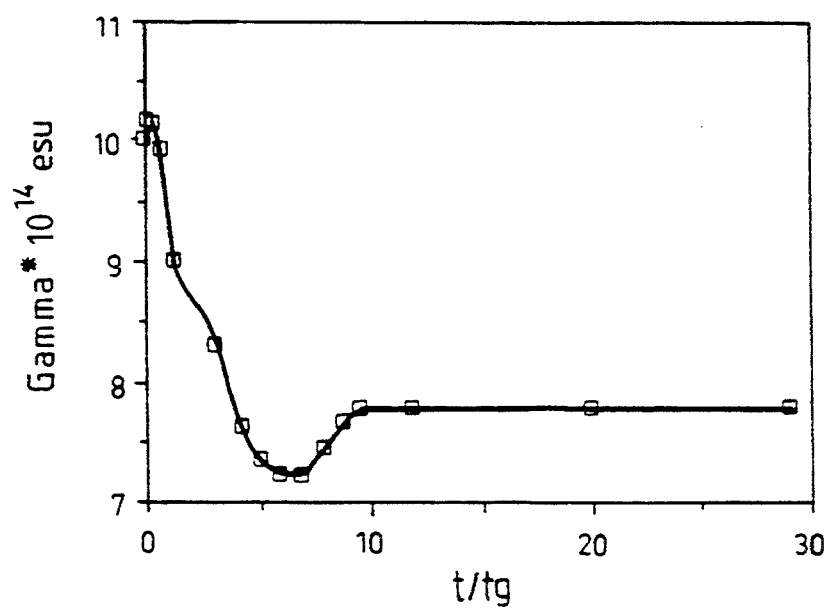
Gel Zr(O-n-Pr)₄/Acac/ MNA: Γ=f(t/tg)

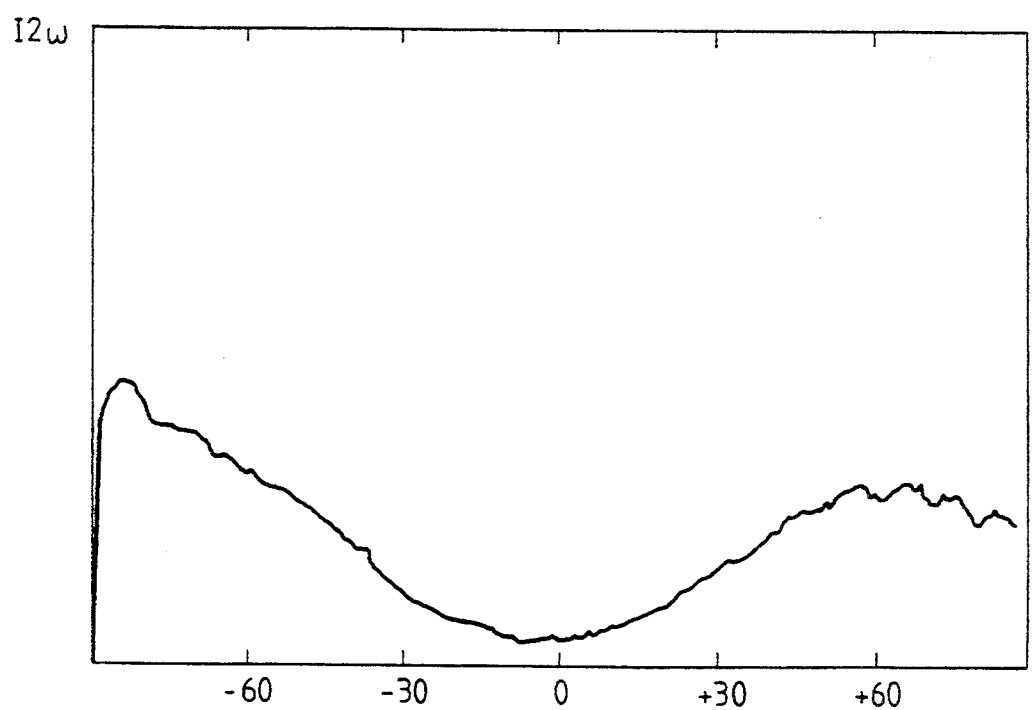
FIG_3

INORGANIC SOL-GEL MATERIAL WHICH HAS A SUSCEPTIBILITY OF THE SECOND ORDER

This application is a continuation of application Ser. No. 07/872,240, filed Apr. 22, 1992, now abandoned.

The present invention relates to the production of a material which has a susceptibility of the second order, consisting of a transparent inorganic matrix in which are included organic molecules which have nonlinear optical properties. It also relates to processes which make it possible to obtain such materials and also to applications for which these materials are intended.

The orientation in a given direction, under the effect of an electrical field, of organic molecules which have nonlinear optical properties and which are also known by the acronym ONLAOM (Optically Non Linear Active Organic Molecules), creates a susceptibility of the second order $x_2$ making it possible to envisage the use of this property in various applications arising from the interaction of a radiation with the said electrical susceptibility $x_2$: second harmonic generation, electro-optical (Pökels) effect, optical parametric amplification and control of the anisotropy of $x_3$.

The fact of being able to orientate the ONLAOMs in an electrical field also opens possibilities of application in the field of linear optics (dichroism).

In particular, the second harmonic is generated when optically nonlinear organic molecules are oriented under the effect of an electrical field.

Although the third harmonic is easily generated ($x_3$) in inorganic matrices containing ONLAOMs because it does not require any preferential orientation of the ONLAOMs and because it can adapt to matrices which are usually amorphous (cf., for example, P. N. Prasad, B. A. Reinhart, Chem. Mat., 2, 660, 1990), this is not the case with the second harmonic $x_2$, which requires the orientation of the abovementioned optically nonlinear molecules.

In fact, the charges which are generally present in inorganic matrices make the strong electrical fields which are necessary for the orientation of the ONLAOMs inoperative when the material is formed and, because of this, result in materials which are inactive from this viewpoint.

The orientation of optically nonlinear dipoles in a solvent or an organic polymer has already been abundantly employed and described in the literature: J. L. Oudar, H. Le Person, Opt. Commun., 15, 258, 1976 and K. D. Singer, M. G. Kuzyk, J. E. Sohn, J. Opt. Ann. B. 4, 968, 1987.

Nevertheless, so far as the Applicant is aware, materials based on an inorganic matrix and on ONLAOM exhibiting the desired orientation and, ipso facto, the expected properties described above have never been produced until now. This is the subject of the present invention.

BRIEF DESCRIPTION OF THE DRAWINGS

FIG. 1 shows the development of the EFISH signal as a function of the polymerization process of Example 1 (a).

FIG. 2 shows the development of the EFISH signal as a function of the polymerization process of Example 1 (b).

FIG. 3 shows the measurement of the second harmonic signal of Example 3.

Wherein EFISH represents Electrical Field Induced Second Harmonic.

The invention therefore relates, firstly, to new, transparent, sol-gel materials which have a susceptibility of the second order $x_2$, consisting of an inorganic matrix containing organic molecules which have nonlinear optical properties (ONLAOM), oriented in a preferential direction.

A number of different ONLAOM molecules can be present in the said material.

The distribution of the molecules in the material means that their mean direction is substantially perpendicular to the plane of the material.

The sol-gel materials according to the invention can be produced in the form of transparent films ranging approximately from 1,000 Å to several mm. These materials are, in addition, suitable for the production of multilayers.

In general, the inorganic matrix is made up of a linear or cyclic chain sequence corresponding to the structure:

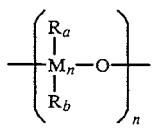

I in which:

$M_n$ is the germanium, silicon or tin atom ($M_n$ being identical or different), $R_a$ and $R_b$, which are identical or different, are a hydrogen atom, a hydrocarbyl or hydrocarbyloxy radical, a radical —O— ONLAOM, a hydrocarbyl radical substituted by one or more molecules of ONLAOM; or to the structure:

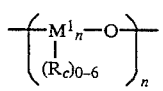

II in which:

$M^1_n$ is a d transition element or a p element or an f transition element ($M^1_n$ being identical or different), $R_c$, identical or different, is a hydrocarbyloxy radical or a radical —O— ONLAOM or the material is made up of a random chain sequence of structures I and II.

The end groups depend on the precursors involved in the process of preparation.

It must be clearly understood that this is a general definition which is not intended strictly to show a person skilled in the art the transparent sol-gel matrices which can be employed. Other sol-gel matrices fulfilling the same function with a view to the implementation of the invention can be employed.

A "hydrocarbyl group" is intended to denote a linear or branched carboacyclic (aliphatic) group containing especially from 1 to 24 carbon atoms, preferably 1 to 6 carbon atoms, and one to five ethylenic or acetylenic unsaturations. Among these unsaturations particular preference will be given to polymerizable unsaturations such as the acrylic and methacrylic double bonds or those substituted by a phenyl radical (styrene). These groups may be optionally substituted by one or more groups Z, which are identical or different and are chosen from halogen atoms and hydroxyl, alkoxy, alkylthio, haloalkoxy, haloalkylthio and aryl radicals. It is also intended to denote groups where the hydrogen atoms have been replaced with fluorine atoms (fluorocarbon).

A "hydrocarbyl group" is also intended to denote carbocyclic or heterocyclic groups chosen from an aromatic or nonaromatic monocyclic system, an aromatic or nonaromatic bicyclic system, an aromatic or nonaromatic polycyclic system or a bridged system. These groups are substituted in the same way as above, with, in addition, alkyl substituents, and can also contain ethylenic or acetylenic, preferably polymerizable, unsaturations.

The metal is preferably chosen from silicon, germanium and tin. The material has between 1 and 20% by weight of the ONLAOM relative to the inorganic matrix.

It should therefore be noted in view of the above description that the ONLAOM molecules present in the gel can be either embedded in the latter, held by the structure of the sol-gel polymer and/or grafted onto the backbone of the gel by a covalent bond or by a coordination bond via an optionally complexing functional group. The covalent bond is suitable for the bonds of the Si—C, Sn—C or Ge—C type, whereas a complexing functional group will be employed in the case of the d, f transition elements or of aluminum.

The material is further defined in that is obtained according to the following process:
the following are brought into contact:
a) a metallic precursor chosen from metal alkoxides or metal alkoxides modified by an ONLAOM molecule or a mixture thereof,
b) a hydrolyzing solution allowing the precursor to be polymerized, in non ionic conditions (non acidic, non basic)
c) a chemical modifier allowing the reactivity of the precursor to be checked,
d) optionally complexing agents or grafting agents,
e) organic molecules which have nonlinear optical properties (ONLAOM) when metal alkoxides modified with a molecule of ONLAOM are not employed and optionally ONLAOMs when the said modified alkoxides are employed, and wherein an electrical field is applied during at least a part of the process of polymerization of the inorganic lattice and/or of drying, or after the drying during a heating and cooling cycle.

The precursors generally correspond to the formula:

$$M(OR_1)_2R_aR_b$$

M being a silicon, germanium or tin atom, $R_a$ and $R_b$ having one of the abovementioned meanings of $R_a$ or $R_b$, $OR_1$ being an identical or different hydrocarbyloxy radical and being the radical allowing the gel lattice to be formed, and/or to the formula:

$$M^1{}_n(OR_1)_{m-x}R_{dx}$$

$M^1{}_n$ being a d transition element or a p element or an f transition element, $R_d$ having one of the meanings of $R_c$ or being the chlorine or bromine atom, m is the valency of the metal ranging from 2 to 6 and x varying from 0 to 6, $OR_1$ has the same meaning as above.

As precursors there may be mentioned by way of example $Si(OMe)_4$, $Zr(O-n-Pr)$, $SiHMe(OEt)_2$, $Ti(OBu)_4$, $Al(OBu)_2$ (ETAC), ETAC being the chelate acetoacetic ester group.

Organic molecules which have nonlinear optical properties (ONLAOM) are well known to a person skilled in the art. A detailed description thereof is to be found, for example, in the following publications: DS Chemla and S-Zogo: Nuclear Optical Properties of Molecules and Crystals, Academic Press 1987.

In general, they correspond to the following structure:

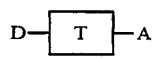

in which:

D is an electron-donor substituent-Lewis base,

A is an electron-attracting substituent-Lewis acid,

T is a system enabling electrons to be transmitted.

The donor/acceptor system is noncentrosymmetric in its widest generality compatible with the existence of a $\beta \neq 0$. The molecule can thus have not only a charge transfer of one-dimensional axial symmetry (1-D) but also of two- or three-dimensional symmetry, as well as all the intermediate situations.

In what follows, R and R' denote saturated or unsaturated, linear, branched or cyclic hydrocarbon substituents which may contain aromatic units, optionally containing heteroatoms (O, N, S etc.) forming part of attached functional groups (alcohols, amines, acids etc.).

Nature of T:

Saturated bonds (sp$^3$ hybridization):

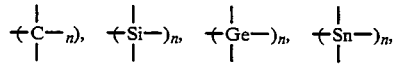

$-(-S-)_n$, $-(-Se-)_n$, $-(-M-)_n$, and the like where M denotes a metal atom and any combination between carbon atoms and heteroatoms or heteroatoms with each other, involving an sp$^3$ hybridization.

Unsaturated bonds: sp$^2$ hybridization):

—C=C—, —N=N—, —CR=B—, CR=N—NR (hydrazones), —CR=N—N=CR (benzalines) or B=N, P and more generally any set of double bonds between carbon atoms, carbon and heteroatoms, or heteroatoms between each other, involving an sp$^2$ hybridization.

sp hybridization:

(—C≡C—)$_n$, acetylene derivatives, linear or cyclic polyynes and, in general, any combination of carbon atoms and heteroatoms, or of heteroatoms with each other, involving an sp hybridization. And, more generally, any combination of bonds involving these sp$^3$, sp$^2$ or sp hybridizations whether comprising heteroatoms or not.

Cyclic derivatives: aromatics (all types of annulenes) or nonaromatics, involving an alternation of double bonds, whether including heteroatoms in the ring or not, charged or otherwise.

Condensed polycyclic derivatives: naphthalene, anthracene and the like.

Cyclic derivatives which are not entirely conjugated, the unsaturated bonds being involved in only a part of the ring.

Any combination of abovementioned structures, comprising saturated or unsaturated bonds, aromatic or other rings, with or without heteroatoms. Examples: phenylhydrazones, benzyldisilanes, benzyldisulfides, polyphenyls, polythiophenes, polypyrroles, stilbenes, tolanes, polydiacetylenes, allenes, polysilanes, polygermanes and the like.

The charge transfer may equally be envisaged in space, via close approach of the donor and acceptor groups in an appropriate conformation.

The T system can also consist of a combination of the abovementioned structures, on which there are grafted atoms and, more generally, various substituents which are donors (amines, alcohols, silanes etc.) or acceptors (cyano, carbonyl and derivatives, nitro, nitroso, pyridinium) of electrons or without any obvious electronic influence (alkanes).

EXAMPLES

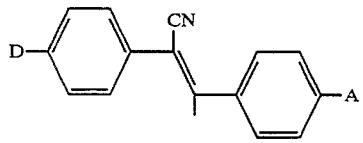

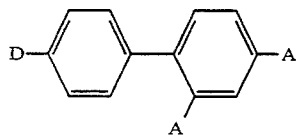

The substituents D and A are preferably situated at the ends of the T system, but can also be placed at any point whatever of T, depending on the desired physicochemical properties.

Nature of the electron-donor substituents D (Lewis base):

D ma be:
a halogen,
A-R where A=O, S, Se,
B-(-RR') where B=N, P, As and any combination of these atoms in linear or branched or cyclic systems, aromatic or otherwise (benzodithia), an N-oxide

whether or not inserted into an aromatic system,

B    C where C≡$C_nH_n$ or any other alicyclic hydrocarbon, and
B=N, P or As,
—O—
—S—
radical derivatives.

Metal complexes with a high electron density, for example ferrocene and other metallocenes, or metal atoms complexed with conjugated cyclic systems, aromatic (cyclopentadienyl, benzene) or otherwise (cyclooctatetraene).

More generally, they are substituents containing nonbonding electron pairs on nonmetal or metal atoms.

Nature of the electron-acceptor substituents A (Lewis acids):

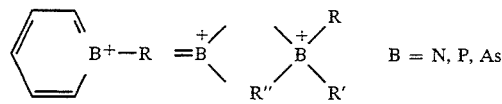

$NO_2$, NO (nitroso)

(N-oxide aromatic or otherwise) sulfones, sulfoxides, $SO_3R$ (sulfonate), Carbonyl derivatives: aldehydes, ketones

where X=halogen, primary, secondary or tertiary amine, OH, OR
Acid anhydrides

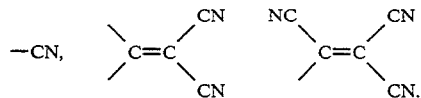

Pyridines and derivatives: any aromatic heterocyclic ring including heteroatoms and therefore clearly an electron-acceptor.

Nonaromatic heterocyclic rings of the dithiolthione and dithiolone type or their nitrogen equivalents.

Metal complexes ($M(CO)_nL$) where M=Cr, Mo, W or any other metal, which are complexed of the Lewis acid type, and L a mono- or bidentate ligand.

Organometallics of the type $AlR_3$, $BR_3$ and $CrR_3$ and more generally any system with unsaturated coordination.

Systems including sp hybridized atoms (alkynes, cyano derivatives etc.).

In general, any structure of the form:

ONLAOM—L where L is a mono-, bi- or polydentate ligand capable of being complexed to the inorganic chain forming the gel, forms part of the invention.

In the case of compounds based on silicon or tin the ONL molecules described above are simply grafted onto the backbone via a bond of the

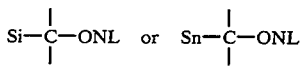

type.

The hydrolysis can be performed in various ways: with pure water or water diluted in a solvent or in a mixture of solvents, with neutral catalysts (not giving rise to charged species) nucleophilic activators (dimethylaminopyridine (DMAP), N-methylimidazole (NmI), dimethyl sulfoxide (DMSO), dimethylformamide (DMF), tetrahydrofuran (THF) etc.), with generators of water in situ via a chemical reaction (esterification, decomposition of tertiary alcohol, etc.) or via a physicochemical control, micellar systems and derivatives.

The chemical modifiers make it possible to control the reactivity of the alkoxide precursors and to give rise to polymeric inorganic lattices which are often associated with the transparency of the gels. For example, carboxylic acids, polyacids, polyols, organic acid anhydrides, amino acids, beta-diketones and derivatives (beta-ketoester, beta-ketoamines), beta-dithiols and derivatives, alcohol ethers, aminoalcohols, alcohol phosphines, phosphinates, phosphonates, hydroxyacids.

A mixture of modifiers can also be employed.

The complexing agents are mono- or polydentate ligands D which modify the precursors at the molecular level to give rise to new precursors. A ligand may be monofunctional but polydentate, such as acetylacetones.

The electrical field applied during the process gives rise to a certain value of $x_2$ and is adapted to the desired orientation of the molecules. It is normally a function of the material and is of the order of several kV/cm.

The materials obtained by the sol-gel process from inorganic glasses (sols, gels, xerogels) which are functionalized by organic molecules carrying a dipole moment and capable of being oriented in an electric field lend themselves to the production of components making use of their linear and nonlinear optical properties. The applications of these components cover a wide field: optical telecommunications, optical signal processing in analog or digital form. These components will be based on linear, quadratic, cubic or mixed optical properties (useful combinations of such properties or of one or more of these properties with one or more properties of another type, this conjunction being involved in a crucial manner in the principle of operation of the device. The photorefractive materials and the associated devices illustrate this latter point, cf. below). These components can operate at wavelengths (excitation and/or emission) corresponding to the parametric (nonresonant), dynamic (resonant) or quasiresonant regime, the ideal compromise having to be defined with regard to the absorption spectrum of the material, its damage threshold and the interaction distance of the various radiations. The nonlinear material can be shaped in accordance with various geometries corresponding to various processes of manufacture and of shaping.

The nature of the sol-gel matrices makes them suited for the deposition as a thin layer of thickness which is controlled by spin-coating during polymerization and for polishing using conventional techniques employed in the case of glasses, this latter point remaining problematic in the case of most of the organic polymers. They can also be formed by filling capillary fibers in solution and subsequent gelling or by drawing a preform according to processes which have been proven in the case of optical fibers made of silica. The encapsulation of nonlinear organic molecules in an inorganic matrix has a favorable effect on their stability and can permit heat treatments at temperatures which are substantially higher than the melting temperature or even the degradation temperature of the pure organic material. Moreover, the connectability to unimodal and multimodal optical fibers made of silica or of fluorinated glasses can be ensured with a better index matching and therefore with lower coupling losses than in the case of components based on essentially different materials, such as inorganic semiconductors and purely organic compounds.

Additional subject matter of the invention is consequently:

The solid material which is cut and polished according to geometries which are difficult to obtain in the case of molecular crystals generally considered to be softer and more fragile.

Oriented thin films (with 1-D confinement) in which the direction of confinement is perpendicular to the substrate.

Multiple stackings of oriented films (or alternations of oriented and unoriented layers of the "active-passive" type which can lend themselves, at certain wavelengths, to "phase quasi-tuning"). Diversely functionalized layers can also be stacked, for example photoconductive or fluorescent layers or those with population inversion (i.e. lasing layer) alternating with nonlinear oriented layers. In the material constituting one layer it will also be possible to mix a number of types of molecules, each exhibiting one or more specific properties, with a view to providing this multifunctional character in a single device. The substrate can be flat or machined by any suitable technological means (example: substrate with a surface modified as a diffraction grading with deposition of metal film so as to localize a plasmon resonance at the metal-dielectric interface or semiconductor substrate capable of being raised to a constant potential).

Optical guides confined in parallel and perpendicular to the substrate (2-D confinement) in groove and ribbon geometries.

Fibers obtained by molding in a hollow capillary before optional sheathing.

Fibers obtained by hot drawing of a preform consisting of the sol-gel material. The orientation can then be obtained by the application of a field.

The functions which can be envisaged in the case of the components based on oriented sol-gel matrices containing organic molecules are listed below and form part of the invention.

Linear components

Susceptibility: $x^{(1)}(-\omega;\omega)$, $\omega$ optical frequency situated in the near UV, the visible or the near IR.

polarizers dichroic filters and gratings, more generally any device employing the birefringence of a thin layer or of an optical guide, this being generally determined by the spectroscopic properties of the molecules included or grafted and by the efficiency of the poling.

Quadratic components

Susceptibility: $x^{(2)}(-\omega_3;\omega_2,\omega_1)$, all the frequencies being situated in the spectral region defined above, second harmonic generation

- parametric amplification (for example parametric repeater with an optical fiber for optical telecommunication),
- parametric emitter,
- parametric oscillator,
- electrooptical effect (cf. below).

A point which is common to components of this type is that of requiring, in a large number of cases, an antireflection and/or dichroic treatment of the light input and output faces: the sol-gel glass makes it possible, on one hand, to dispense with encapsulation and, on the other hand, to apply the dielectric layers required by the applications directly to the active material. The losses and the finenesses of the Fabry-Perrot cavities will thereby be decreased and increased respectively.

Electrooptical components

Pökels susceptibility: $x^{(2)}(-\omega\pm\Omega;\omega\pm\Omega)$ is an optical frequency and $\Omega$ radio frequency (range extending from a few tens of kHz to several tens of GHz).

- Pökels effect laser gain trigger device (Q-switch) in a cavity, it being then possible for to go down to very low frequencies of the order of one Hz or less.
- Y electrooptical connector allowing an optical signal to be multiplexed or demultiplexed in guided propagation form.
- Phase modulation device in guided wave form.
- Directional coupler making it possible to connect two inputs to two outputs depending on the value of an electrical control voltage signal.
- Machs-Zehnder type interferometer in guided waves form for the modulation of amplitude of an optical carrier wave.

Photorefractive components

The principle of operation of components of this type is based on the combination of linear electrooptical and photoconductive effects. Any photorefractive device which employs, at least for the electrooptical property, an oriented sol-gel glass functionalized by molecular species such as those described above is involved. These include:

- Thin electrooptical layers for a spatial light modulator and their applications to the "incoherent-coherent" conversion of optical signals or of images or to optical systems with neurone lattices, for example. The photoconductive function can be provided by one or more functionalized layers parallel to the electrooptical layer or layers described above. The same layer can also provide both functionalities, the photoconductivity resulting from the presence of appropriate molecules and/or of electron-donating and electron-attracting defects present naturally in the glass or incorporated during the manufacturing process.
- Any signal-processing device relying on a photorefractive effect such as mixing with 2 and 3 waves for the amplification of light, real-time holography and shape or image recognition. To this end, a further subject of the invention, besides the insertion and/or grafting of the ONL molecules described above, is the insertion and/or the grafting of chemical entities which impart a photoconductive character to the material.

Anisotropic cubic nonlinear components

Orientation of cubic materials by poling is not necessary owing to symmetry to obtain a $x^{(3)}$ effect. It can, nevertheless, be desirable in order to:

- Raise the susceptibility in the direction of orientation, the susceptibility being weighted in an isotropic medium by an orientation factor of less than unity.
- Make the property anisotropic, the medium becoming nonlinearly birefringent, offering the possibility of phase tuning and of selective addressing using polarization.

The included or grafted molecules can be of two types:

- The molecules described above with a priori quadratic finality.
- Centrosymmetric conjugated molecules (polyenes, cyclic conjugated derivatives, or the combination of both, optionally containing heteroatoms, substituted symmetrically at the end of a chain) to which a dipolar group will have been rigidly attached to permit dipolar orientation in a field.

The components which can be envisaged therefore cover all the applications related to the $x^{(3)}$ tensor, namely:

- Optical bistability,
- Modulator using an "electrical" Kerr effect,
- Optical gate or logic using an optical Kerr effect (the index is then linearly dependent on the optical intensity at the wavelength of the probe or at that of another beam.

The examples below illustrate the invention.

Example 1—Orientation of optically nonlinear molecules inserted into a sol-gel matrix The development of the EFISH signal measured in a gel based on silicon oxide into which are inserted one or more organic molecules which have nonlinear optical properties is described below by way of example.

a) An $Si(OMe)_4$ (TMOS) precursor is dissolved in a methanol solution containing the optically active molecule (for example 4-methylnitroaniline, MNA) optionally containing a nucleophilic activating catalyst (e.g. 4-dimethylaminopyridine, DMAP). This first solution is then hydrolyzed by addition of pure or solvent-diluted water. Depending on the proportions of the various reactants the gelling time can be adjusted from a few minutes to a few hours.

Without the application of an electrical field and in the absence of any crystallites these gels do not give rise to a second harmonic. On the other hand, an electrical field of 4 kV/mm is sufficient to orient the molecules and to give rise to a second harmonic. The development of the EFISH signal as a function of the polymerization process (gel time=tg) is shown in FIG. 1. At short times the value of the macroscopic susceptibility $\Gamma$ in the sol is close to that of the organic molecule in solution in a solvent. As the polymerization process progresses, $\Gamma$ decreases because the orientation of the dipoles is impeded by the increase in the viscosity of the material. The various transitions observed are related to the development of the internal texture of the gel. A decreasing but nonzero value of $\Gamma$ is observed, so long as the gel remains moist (in the presence of solvent). During the drying of the gel all the dipoles are immobilized, and this entails a minimum EFISH=Electrical Field Induced Second Harmonic value of the macroscopic susceptibility $\Gamma$. This is then reduced to the purely electronic cubic component $\gamma_e$ of the sample.

Organic molecules have also been inserted into gels based on the oxide of a d transition and f transition element, or gels based on tin, germanium, aluminum or boron oxide.

b) Production of a zirconium-based gel.

A $Zr(O-n-Pr)_4$ precursor is dissolved in a solution of n—PrOH containing the optically active molecule (for example 4-methylnitroaniline, MNA). A chemical modifier, acetylacetone, is then added in order to reduce the reactivity of the metal precursor. The solution thus obtained is finally hydrolyzed with the aid of a solution of water dissolved in a solvent or a mixture of solvents. The optically nonlinear molecule can also be added with the hydrolyzing solution. The gelling time can be adjusted from a few minutes to a few hours depending on the precursor concentration, the degree of hydrolysis and the quantity of chemical modifier. The results obtained in the form of EFISH are similar to those obtained in the case of the TMOS precursor (FIG. 2).

Example 2—Orientation of optically nonlinear molecules grafted onto the inorganic backbone of the gels These molecules were also grafted onto oxide-based backbones via either Si-C or Sn-C bonds or, in the case of the other elements (d transition, f transition, aluminum or boron) via chemical bonds of the M-X type (where X=O, S, N, P). The bonds which are the most stable towards the hydrolysis reaction were, of course, produced by the use of complexing agents.

In the case of a precursor comprising an optically active molecule grafted onto the polymer backbone, two examples may be mentioned:

a) An $Si(OMe)_4$ (TMOS) precursor is mixed with N-(3-triethoxysilylpropyl)-2,4-dinitrophenylamine (called $Si(OEt)_3(N\Phi)$). The mixture is then dissolved in a methanol solution optionally containing a nucleophilic activating catalyst (e.g. 4-dimethylaminopyridine, DMAP). This first solution is then hydrolyzed by addition of pure or solvent-diluted water. Depending on the proportions of the various reactants, the gelling time can be adjusted from a few minutes to a few days. The macroscopic susceptibility obtained on applying the electrical field also decreases with the polymerization process.

b) A $Zr(O-n-Pr)_4$ precursor is dissolved in n—PrOH. To the mixture thus obtained is added a chemical modifier containing an optically nonlinear functional group, for example 4-aminosalicylic acid or 4-nitro-2-acetylacetone-aniline. The solution thus obtained is finally hydrolyzed with the aid of a solution of water dissolved in a solvent or a mixture of solvents. The gelling time can be adjusted from a few minutes to a few hours. The macroscopic susceptibility obtained on application of the electrical field F also decreases with the polymerization process.

Example 3

One mole of $SiHMe(OEt)_2$ precursor is dissolved in a solvent (for example acetone) or in a mixture of solvents containing an optically nonlinear molecule (N-(4-nitrophenyl)-L-prolino(NPP)). This solution is then hydrolyzed. A second precursor (e.g. $Zr(OPr^n)_4$) is then dissolved in the initial solution. A colloidal solution containing the optically nonlinear molecule is obtained.

This colloidal solution is deposited in the form of a polishable film of variable thickness (1000 Å to several mm) which has good mechanical and optical qualities and does not contain any microcrystallites. These films are polishable. This dried film does not exhibit any second harmonic. On the other hand, if an electrical field of approximately 10 kV/cm is applied (resulting in a local field of the order of 100 V/μm) either during the process of polymerization and drying of the film or while simultaneously performing a cycle of heating and cooling of the formed and polished film, a large second harmonic signal is then measured, as shown in FIG. 3. Successive depositions of polished films can thus be carried out in order to reach thicknesses of several millimeters. FIG. 3: gel of 60 μm thickness doped with 1% of NPP, 7 days after corona poling (needle placed at 2 cm and raised to 14 kV) at a temperature of 90° C. for 30 min. The figure shows the response of the sample in giving rise to second harmonic (at 1.06 μm) in p-p configuration (fundamental and harmonic polarization in the plane of incidence). The signal is 1400 times weaker than that emitted by a quartz lamina.

Example 4

3 g of 3-methacryloyloxypropyltrimethoxysilane (0.012 mol), 1.56 g of N-[3-(triethoxysilyl)propyl]-2,4-dinitrophenylamine, (alkoxide carrier of the functional group active in nonlinear optics) (0.004 mol) and 0.72 g of water (0.04 mol) and 40 ml of chlorobenzene are mixed. The mixture is refluxed for 12 hours.

A solution made up of 1.31 g of $Zr(O-n-Pr)_4$ (0.004 mol) 0.8 g of acetylacetone (0.008 mol) and 20 ml of chlorobenzene is then added. Refluxing is continued for 2 hours.

2,2'-Azobis(2-methylpropionitrile) is added under argon atmosphere to catalyze the organic polymerization (2 mol % relative to 3-methacryloyloxypropyltrimethoxysilane). A clear solution is obtained, which can be easily employed for producing transparent films.

What is claimed is:

1. A process for preparing a transparent solgel material having a susceptibility of a second order $X_2$, consisting of an inorganic matrix containing organic molecules having nonlinear optical properties (ONLAOM) oriented in a preferential direction, said ONLAOM being grafted onto the backbone of the gel by a covalent bond, and having a chain sequence containing the formula

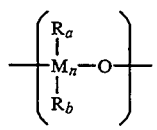

wherein:

$M_n$ is selected from the group consisting of germanium, silicon and tin, $R_a$ and $R_b$ are selected from the group consisting of a hydrogen atom, a hydrocarbyl radical, a substituted hydrocarbyl radical, a hydrocarbyloxy radical, a radical —O— ONLAOM, and a hydrocarbyl radical substituted by at least one molecule of ONLAOM, and $R_a$ and $R_b$ are the same or different, comprising the steps of:
a) mixing together a metallic precursor made of a mixture of a metal alkoxide and a metal alkoxide modified by an ONLAOM molecule and a hydrolyzing solution of pure water, water diluted in a solvent or water diluted in a mixture of solvents;

b) allowing the precursor to react with the hydrolyzing solution in the presence of neutral catalysts to polymerize the precursor; and c) applying an electrical field during at least a part of the polymerization step.

2. The process of claim 1, further comprising adding a chemical modifier to check the reactivity of the precursor after step b).

3. The process of claim 1, further comprising the step of applying a second electrical field during a drying cycle.

4. The process of claim 1, wherein the neutral catalyst is a nucleophilic activator which is dimethylaminopyridine, N-methylimidazole, dimethylsulfoxide, dimethylformamide, or tetrahydrofuran.

* * * * *